United States Patent
Huynh et al.

(10) Patent No.: US 11,232,016 B1
(45) Date of Patent: Jan. 25, 2022

(54) DEBUG FOR COMPUTATION NETWORKS USING ERROR DETECTION CODES

(71) Applicant: Amazon Technologies, Inc., Seattle, WA (US)

(72) Inventors: Jeffrey T. Huynh, San Jose, CA (US); Ron Diamant, Albany, CA (US); Sundeep Amirineni, Austin, TX (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 16/138,145

(22) Filed: Sep. 21, 2018

(51) Int. Cl.
| | |
|---|---|
| *G06F 11/36* | (2006.01) |
| *G06N 3/063* | (2006.01) |
| *G06F 8/41* | (2018.01) |
| *G06F 11/10* | (2006.01) |

(52) U.S. Cl.
CPC ............ *G06F 11/3648* (2013.01); *G06F 8/41* (2013.01); *G06F 11/1004* (2013.01); *G06N 3/063* (2013.01); *G06F 11/3624* (2013.01); *G06F 11/3644* (2013.01)

(58) Field of Classification Search
CPC ..... H04L 41/14; H04L 41/145; H04L 41/147; G06N 7/005; G06N 20/00; G06F 11/3604; G06F 11/3608; G06F 11/362; G06F 11/366; G06F 11/3636; G06F 11/3644; G06F 11/3684; G06F 11/3692; G06F 11/3624
See application file for complete search history.

(56) References Cited

U.S. PATENT DOCUMENTS

| | | | | |
|---|---|---|---|---|
| 4,528,662 A | * | 7/1985 | Floyd | ............... H04Q 9/14 370/216 |
| 5,544,311 A | * | 8/1996 | Harenberg | ........ G06F 11/2236 714/30 |

(Continued)

OTHER PUBLICATIONS

"A Quick Introduction to Neural Networks" by Ujjwalkarn Aug. 9, 2016 https://ujjwalkarn.me/2016/08/09/quick-intro-neural-networks/ (Year: 2016).*

(Continued)

*Primary Examiner* — Joseph O Schell

(74) *Attorney, Agent, or Firm* — Weaver Austin Villeneuve & Sampson LLP

(57) ABSTRACT

Techniques disclosed herein relate generally to debugging complex computing systems, such as those executing neural networks. A neural network processor includes a processing engine configured to execute instructions to implement multiple layers of a neural network. The neural network processor includes a debugging circuit configured to generate error detection codes for input data to the processing engine or error detection codes for output data generated by the processing engine. The neural network processor also includes an interface to a memory device, where the interface is configured to save the error detection codes generated by the debugging circuit into the memory device. The error detection codes generated by the debugging circuit are compared with expected error detection codes generated using a function model of the neural network to identify defects of the neural network.

20 Claims, 9 Drawing Sheets

(56) References Cited

U.S. PATENT DOCUMENTS

| | | | | |
|---|---|---|---|---|
| 5,671,352 | A * | 9/1997 | Subrahmaniam | G06F 11/261 |
| | | | | 714/33 |
| 5,872,910 | A * | 2/1999 | Kuslak | G06F 11/2236 |
| | | | | 712/227 |
| 6,477,666 | B1 * | 11/2002 | Sanchez | G06F 11/3688 |
| | | | | 714/38.12 |
| 7,320,114 | B1 * | 1/2008 | Jain | G06F 11/261 |
| | | | | 714/47.1 |
| 9,928,040 | B2 * | 3/2018 | Tarlow | G06F 11/3604 |
| 2002/0169997 | A1 * | 11/2002 | Chen | G06F 11/2284 |
| | | | | 714/25 |
| 2003/0208710 | A1 * | 11/2003 | Martin-de-Nicolas | |
| | | | | G06F 11/263 |
| | | | | 714/736 |
| 2006/0218438 | A1 * | 9/2006 | Yamaguchi | G06F 11/2221 |
| | | | | 714/5.11 |
| 2014/0075245 | A1 * | 3/2014 | Shim | G06F 11/3624 |
| | | | | 714/38.1 |
| 2015/0143179 | A1 * | 5/2015 | Desai | G06F 11/3688 |
| | | | | 714/38.1 |
| 2019/0147131 | A1 * | 5/2019 | Fukano | G06F 11/3684 |
| | | | | 703/14 |

OTHER PUBLICATIONS

Wikipedia's Processor Register historical version published Sep. 8, 2018 https://en.wikipedia.org/w/index.php?title=Processor_register&oldid=858652599 (Year: 2018).*

Nvidia, Nvidia Cuda C Programming Guide, Version 4.2, Apr. 16, 2012, 173 pages.

* cited by examiner

DEBUG FOR COMPUTATION NETWORKS USING ERROR DETECTION CODES

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform post-processing operations on the intermediate output to generate a final output. An artificial neural network, such as a deep neural network, may include thousands or more of processing nodes and millions or more of parameters, and thus each inference may include massive computation. For example, in ResNet-50, each inference may include about 8 billion arithmetic operations. Thus, when a wrong result is generated by a neural network, it is very difficult to determine which layer, node, or operation causes the wrong result.

BRIEF DESCRIPTION OF THE DRAWINGS

Various embodiments in accordance with the present disclosure will be described with reference to the drawings, in which.

DETAILED DESCRIPTION

Figure 1:
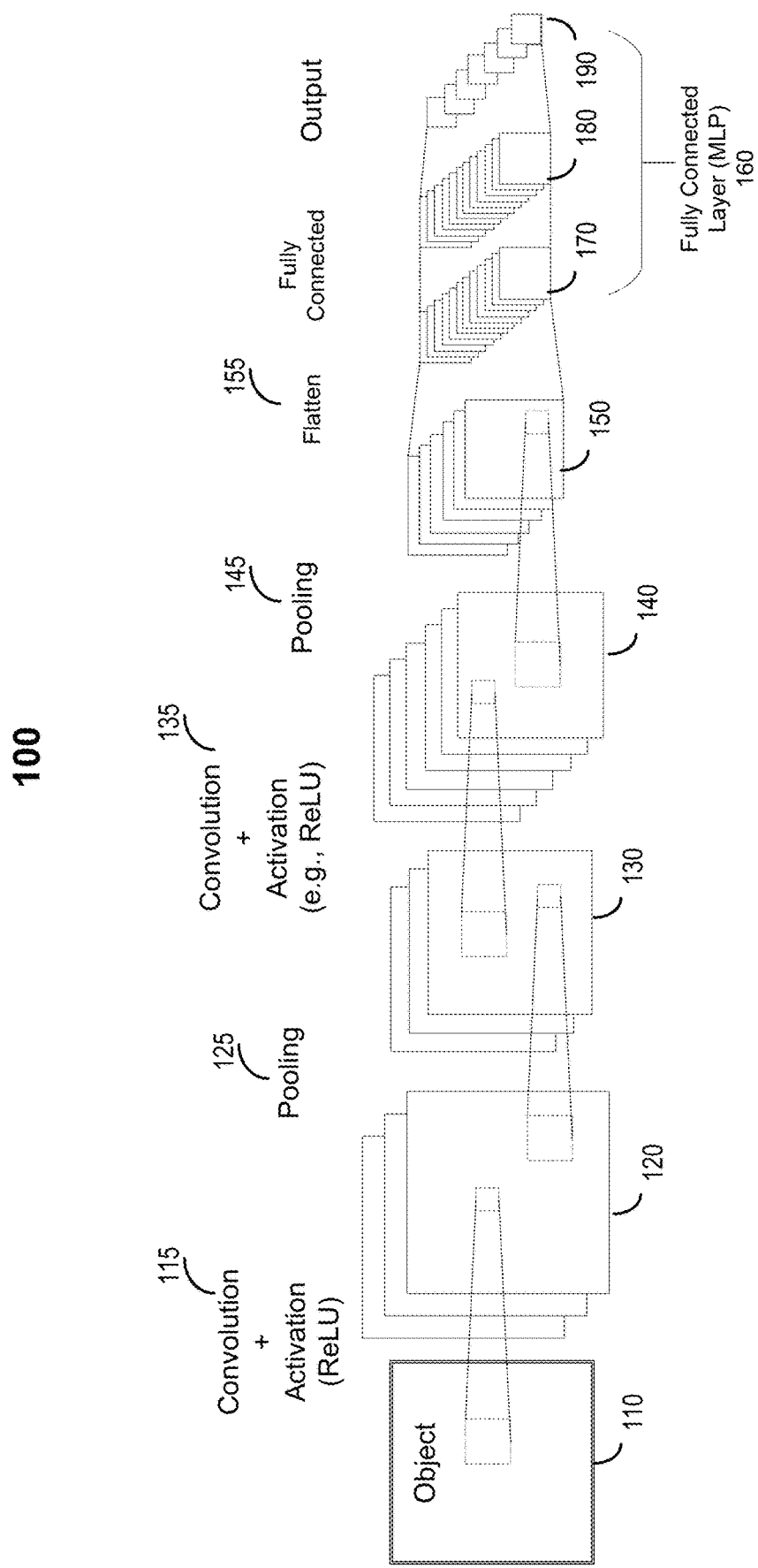
FIG. 1 illustrates an example convolutional neural network (CNN)

Techniques disclosed herein relate generally to debugging a complex computing system, such as neural networks (e.g., deep neural networks). According to certain embodiments, debugging circuits may be added to various processing engines of a neural network to generate debug datalogs during the operation of the neural network. In some embodiments, the debugging circuits may be configurable to generate debug datalogs at different debug levels. The debug datalog generated by the debugging circuits during the operation of the neural network may be compared against an expected debug datalog to determine the discrepancy and the possible root causes of certain erroneous results generated by the neural network. For example, the instruction associated with the first discrepancy between the expected debug datalog and the debug datalog generated during the operation of the neural network is likely the instruction during the execution of which an error may have occurred.

In some embodiments, one or more cyclic redundancy check (CRC) circuits may be added at the input and/or output of each processing engine of a neural network. The CRC circuits may generate one or more CRC signatures (e.g., CRC words) for a respective instruction. For example, two or more CRC signatures may be generated for an instruction executed by a processing engine, where one CRC signature may be generated by a CRC circuit based on some input data to the processing engine and another CRC signature may be generated by another CRC circuit based on the output data from the processing engine. By logging the CRC signatures of the input and/or output data for a processing engine, rather than the input and/or output data for the processing engine, the total amount of debug data to be logged may be significantly reduced to minimize the impact of the debugging circuit on the performance of the processing engine.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Techniques disclosed herein may be used to debug any neural network or any other computing system that may include multiple processing engines or may perform a large number of calculations before yielding a final result, such as a convolutional neural network (also referred to as ConvNets or CNNs). Convolutional neural networks are a type of neural networks that are very effective for applications such as image recognition and classification. For example, CNNs may be used to identify faces, objects, and traffic signs for use in robots and self-driving cars. CNNs may be used in natural language processing tasks (such as sentence classification) as well. A CNN may perform operations including, for example, (1) convolution; (2) non-linearity (or activation) function (e.g., ReLU); (3) pooling or sub-sampling; and (4) classification. These operations may be the basic building blocks of a convolutional neural network. Different CNNs may have different combinations of these four main operations (as well as additional operations). For example, a ResNet-50 network may include 50 network layers that include mostly convolution layers and a few pooling layers.

The training process and inference process for a neural network (e.g., a CNN) may be performed on hardware, software, or a combination of hardware and software. Training an artificial neural network or using the trained artificial neural network for inference generally requires a significant amount of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for the training and/or inference. In various embodiments, the training and inference may be performed on a cloud, on a data center, or on a device.

FIG. 1 illustrates an example convolutional neural network (CNN) 100 for image or other object classification. CNN 100 may include four main operations: (1) convolution; (2) non-linearity (or activation) function (e.g., ReLU); (3) pooling or sub-sampling; and (4) classification (fully-connected layer).

An object 110 to be classified, such as an input image, may be represented by a matrix of pixel values. The input image may include multiple channels, each channel representing a certain component of the image. For example, an image from a digital camera may have a red channel, a green channel, and a blue channel. Each channel may be represented by a 2-D matrix of pixels having pixel values in the range of, for example, 0 to 255 (i.e., 8-bit). A gray-scale image may have only one channel. In the following description, the processing of a single image channel using CNN 100 is described. Other channels may be processed similarly.

As shown in FIG. 1, object 110 (e.g., the input image) may first be processed by a first convolution layer 115 using a first filter, where first convolution layer 115 may perform a convolution between a matrix representing the input image and a matric representing the first filter. The convolution may include multiple matrix multiplication. First convolution layer 115 may also perform a non-linear activation function (e.g., ReLU). An output matrix 120 from first convolution layer 115 may have smaller dimensions than the input image, and may be referred to as the convolved feature, activation map, or feature map. First convolution layer 115 may perform convolutions on the input image using multiple filters to generate multiple output matrices (or feature maps) 120. The number of filters used may be referred to as the depth of the convolution layer. In the example shown in FIG. 1, first convolution layer 115 may have a depth of three. Each output matrix (or feature map) 120 may be passed to a pooling layer 125, where each output matrix 120 may be subsampled or down-sampled to generate a matrix 130.

Matrix 130 may be processed by a second convolution layer 135 using a filter. A non-linear activation function (e.g., ReLU) may also be performed by the second convolution layer 135 as described above. An output matrix 140 (or feature map) from second convolution layer 135 may have smaller dimensions than matrix 130. Second convolution layer 135 may perform convolutions on matrix 130 using multiple filters to generate multiple output matrices (or feature maps) 140. In the example shown in FIG. 1, second convolution layer 135 may have a depth of six. Each output matrix 140 may be passed to a pooling layer 145, where each output matrix 140 may be subsampled or down-sampled to generate a matrix 150.

The two-dimensional output matrices 150 from pooling layer 145 may be flattened to a one-dimensional (1-D) vector by a flatten layer 155, and passed through a fully-connected layer 160 (i.e., a multi-layer perceptron (MLP)). Fully-connected layer 160 may include an input layer 170 that takes the 1-D output vector from flatten layer 155. Fully-connected layer 160 may also include a hidden layer and an output layer 190. Fully-connected layer 160 may classify the object in the input image into one of several categories using feature maps or matrix 150 and, for example, a Softmax function.

The operation of the fully-connected layer may be represented by matrix multiplications. For example, if there are M nodes on input layer 170 and N nodes on hidden layer 180, where the input $X=[x_1, x_2, x_3, \ldots, x_M]$, and the weights of the connections between the M nodes on input layer 170 and the N nodes on hidden layer 180 can be represented by:

$$W = \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix}. \quad (1)$$

The output Y of hidden layer 180 may be determined by:

$$Y = X \times W = [x_1, x_2, x_3, \ldots, x_M] \times \begin{bmatrix} w_{11} & w_{12} & w_{13} & \ldots & w_{1N} \\ w_{21} & w_{22} & w_{23} & \ldots & w_{2N} \\ w_{31} & w_{32} & w_{33} & \ldots & w_{3N} \\ \ldots & \ldots & \ldots & \ldots & \ldots \\ w_{M1} & w_{M2} & w_{M3} & \ldots & w_{MN} \end{bmatrix} = [y_1, y_2, y_3, \ldots, y_N]. \quad (2)$$

When a batch of K samples each including M inputs are received at the fully-connected layer, the inputs may be represented by a K×M matrix for the K samples. The outputs Y of hidden layer 180 may include K×N elements and may be determined by a 2-D matrix multiplication.

The convolution operations in a CNN may be used to extract features from input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to get a final value that represents a single element of an output matrix (e.g., a feature map). A filter may act to detect certain features from the original input image.

The convolution using one filter over an input pixel array may be used to produce one feature map, and the convolution using another filter over the same input pixel array may generate a different feature map. In practice, a CNN may learn the weights of the filters on its own during the training process based on some user specified parameters (which may be referred to as hyperparameters), such as the number of filters, the filter size, the architecture of the network, etc.

The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters used for the convolution operation. For example, in CNN 100 shown in FIG. 1, three distinct filters are used in first convolution layer 115 to perform convolution operations on the input image, thus producing three different output matrices (or feature maps) 120. Stride is the number of pixels by which the filter matrix is slid over the input pixel array. For example, when the stride is 1, the filter matrix is moved by one pixel at a time. When the stride is 2, the filter matrix is moved by 2 pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 1, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions, such as tan h or sigmoid function, can also be used, but ReLU has been found to perform better in many situations.

Spatial pooling (also referred to as subsampling or downsampling) may reduce the dimensions of each feature map, while retaining the most important information. In particular, pooling may make the feature dimensions smaller and more manageable, and reduce the number of parameters and computations in the network. Pooling may also make the network invariant to small transformations, distortions, and translations in the input image such that a small distortion in the input image may not change the output of pooling because the maximum or average value in a local neighborhood is used. Thus, pooling may help to achieve an equivariant representation of the input image such that objects in an image may be detected no matter where they are located. Spatial pooling may be performed in different ways, such as max pooling, average pooling, sum pooling, etc. In max pooling, the largest element in each spatial neighborhood (e.g., a 1×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

As shown in FIG. 1, CNN 100 may include two or more sets of convolution, activation, and pooling layers, where the second convolution layer 135 may perform convolution operations on the output of pooling layer 125 using six filters to produce a total of six feature maps. The activation operation (e.g., ReLU) may then be applied individually on all of these six feature maps. Next, a max pooling operation may be performed on each of the six rectified feature maps. These convolution, ReLU, and pooling layers may, in combination, extract useful features from an image, introduce non-linearity in the network, and reduce feature dimensions, while making the features equivariant to scale and translation. The output matrices 150 of pooling layer 145 represent high-level features of the input image, and may be used as an input to fully-connected layer 160.

Fully-connected layer 160 may be a multi-layer perceptron. In the fully-connected layer, every node in a layer is connected to every node on the adjacent layer(s). Fully-connected layer 160 may use the high-level features of the input image represented by output matrices 150 to classify the input image into various classes. The fully-connected layer may also be used as a low-cost way to learn the non-linear combination functions of these high-level features. The features from the convolution and pooling layers may be good for the classification task, but non-linear combinations of those features might be even better.

Fully-connected layer 160 may use a Softmax activation function on the output layer. The Softmax function takes a vector of real-valued scores and transforms it into a vector with values (e.g., probabilities) between zero and one that sum to one. Thus, the sum of the output values from the fully-connected layer may be 1. In some embodiments, other classifiers, such as a support vector machine (SVM) classifier, can also be used.

In the example shown in FIG. 1, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 100, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

The total error at the output layer (e.g., the sum over all possible classes) may be calculated by summing the probability errors for all possible classes. For example, the total error may be calculated based on:

$$\text{Total Error} = \frac{1}{2}\Sigma(\text{target probability} - \text{output probability})^2, \quad (3)$$

where the target probabilities may include a "1" corresponding to the actual class of the object in the image, and "0s" corresponding to other classes. Techniques such as the backpropagation techniques may then be used to calculate the gradients of the error with respect to parameters and weights to be trained in the network and use the gradient descent to update the parameters and weights to be trained in the network to minimize the output error. The weights may be fine-tuned or adjusted according to their contribution to the total error. When the same training sample is used as the input again, the output probabilities might be closer to the target probabilities, which indicates that the network has learned to classify this particular image. As described above, some parameters of the convolutional neural network, such as the number of filters, filter sizes, architecture of the network, etc., may have been pre-selected and remain unchanged during the training process. The above-described training process may be repeated for all training samples in the training dataset.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

Figure 2:
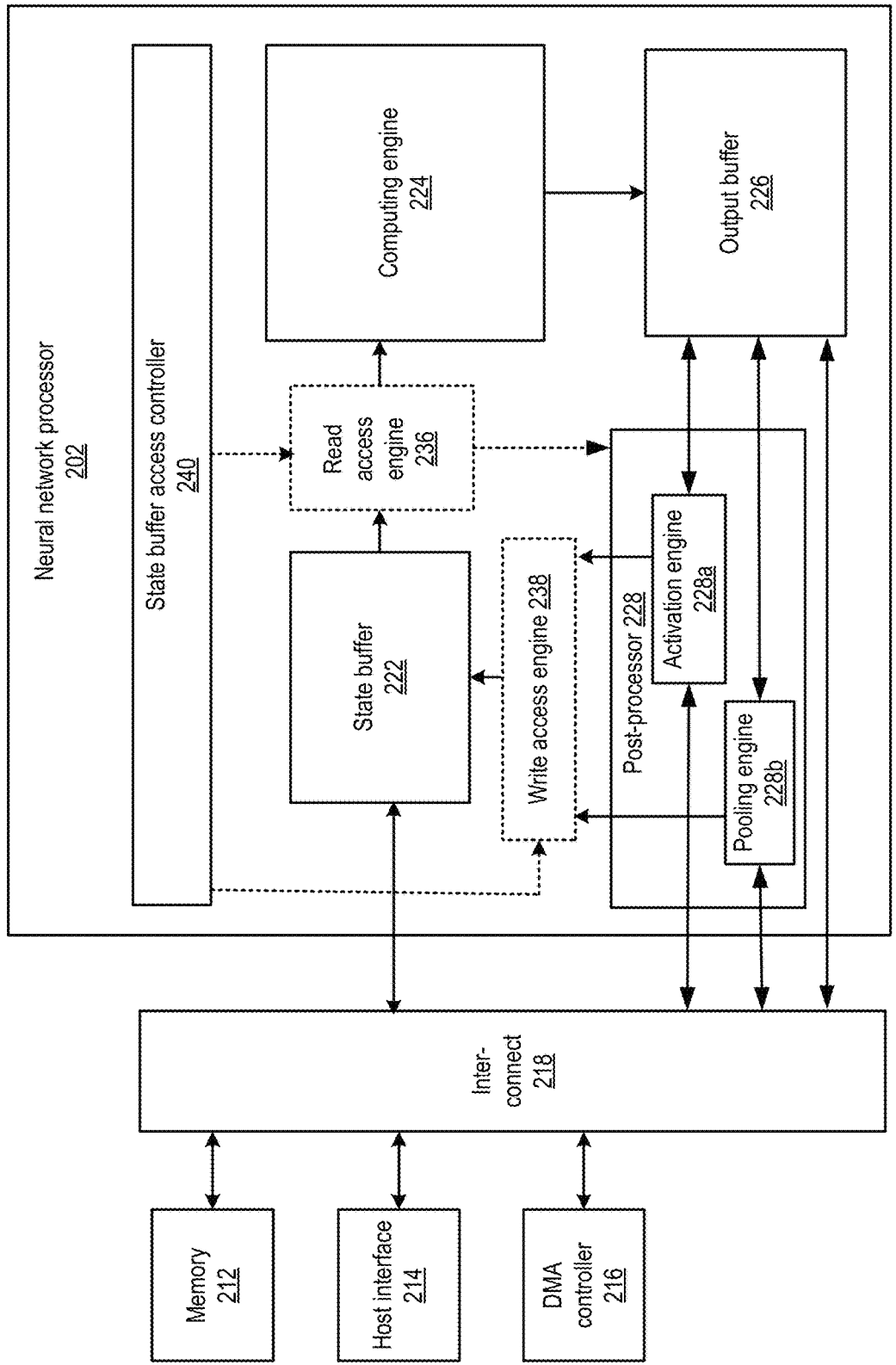
FIG. 2 illustrates an example apparatus for executing an example artificial neural network.

FIG. 2 illustrates an example apparatus 200 for an example artificial neural network. Apparatus 200 may be part of a computer system, such as a data center server. In some embodiments, apparatus 200 may be part of a multi-tenant compute service system (e.g., a cloud) and may communicate with a host device (not shown in FIG. 2) to provide computing and memory resources for a computing service. Apparatus 200 may include a neural network processor 202 coupled to memory 212, a direct memory access (DMA) controller 216, and a host interface 214 via an interconnect 218. Neural network processor 202 may provide computing resources to support inference using a trained neural network. More detail of the operation of neural network processor 202 is described below.

Memory 212 may be configured to store executable instructions, input data (e.g., pixel data of images), and weights (e.g., the filter parameters) or other parameters of the trained neural network received from, for example, a host device. Memory 212 may also be used to store the output of neural network processor 202 (e.g., one or more image recognition decisions on the input images) or some intermediary data. Memory 212 may include any suitable memory, such as dynamic random access memory (DRAM), synchronous DRAM (SDRAM), double data rate DRAM (DDR DRAM), storage class memory (SCM), flash memory devices, etc.

DMA controller 216 may be configured to perform DMA operations to transfer data between neural network processor 202 and the host device or memory 212. For example, the host device may store the instructions, input data, the weights, and other parameters of the neural network at memory 212. The host device may provide the memory addresses for the stored instructions, data, weights, and other parameters of the neural network to neural network processor 202 (e.g., in the form of memory descriptors). Neural network processor 202 may then obtain the stored instructions, data, weights, or other parameters of the neural network using DMA controller 216 based on the memory addresses provided by the host device. Neural network processor 202 may also store the results of computations (e.g., one or more image recognition decisions or intermediary data) at memory 212, and provide the memory addresses for the stored results to the host device.

Host interface 214 may enable communications between the host device and neural network processor 202. For example, host interface 214 may be configured to transmit the memory descriptors including the memory addresses of the stored data (e.g., input data, weights, results of computations, etc.) between the host device and neural network processor 202. Host interface 214 may include, for example, a peripheral component interconnect express (PCIe) interface or any suitable interface for communicating with the host device.

Neural network processor 202 may provide the computing resources to support the neural network computations for inference, such as image classification. In the example shown in FIG. 2, neural network processor 202 may include an integrated circuit, such as a system-on-chip (SoC), FPGA, or ASIC. Neural network processor 202 may include a number of circuit components, such as a state buffer 222, a computing engine 224, an output buffer 226, and a post-processor 228. In some implementations, neural network processor 202 may also include a read access engine 236 and a write access engine 238 to provide computing engine 242 and post-processor 228 with read and write access to state buffer 222 as discussed in detail below.

State buffer 222 may be configured to provide caching of data used for computations at computing engine 224. The data cached at state buffer 222 may include, for example, the input data and weights obtained from memory 212, output data from computing engine 224, and/or output data from post-processor 228. The caching may reduce the effect of memory access bottleneck (e.g., caused by the latencies at memory 212, DMA controller 216, interconnect 218, etc.) on the performance of computing engine 224. State buffer 222 may be an on-chip memory device and may include, for example, static random access memory (SRAM). In some embodiments, state buffer 222 may be partitioned based on the organization of computing engine 224. For example, state buffer 222 may include multiple SRAM banks, where each bank may be configured to store input data and weights for a row of computing engine 224.

Computing engine 224 may include an array of processing elements (PEs) configured to perform one or more arithmetic operations (e.g., vector multiplication) for neural network computations. In some implementations, computing engine 224 may be a matrix multiplication unit that may be used for matrix convolution and/or matrix multiplication, and thus may be used to implement a convolution layer or a fully-connected layer of the neural network. For example, in some implementations, computing engine 224 may include a systolic array that includes a two-dimensional array of processing elements arranged in rows and columns for matrix multiplication.

Post-processor 228 may be configured to perform post-processing on the outputs of computing engine 224 that may be stored in output buffer 226. In the example shown in FIG. 2, post-processor 228 may include an activation engine 228a and a pooling engine 228b. Activation engine 228a may perform one or more activation (non-linear) functions, such as tan h, sigmoid, ReLU, etc., on the outputs of a convolution layer to generate the output data, and store the output data in state buffer 222. In some implementations, activation engine 228a may also include one or more multiplier circuits. Pooling engine 228b may perform, for example, maximum pooling, average pooling, etc., on the outputs of a convolution layer or activation engine 228a to generate subsamples, and store the subsamples in state buffer 222. In some implementations, pooling engine 228b may also include one or more multiplier circuits. Pooling engine 228b and/or activation engine 228a may also be controlled to be skipped for certain convolution layers. For example, as discussed above, a CNN may perform multiple convolution and ReLU operations before performing a pooling operation.

In some implementations, post-processor 228 may also include a Softmax engine (not shown in FIG. 2) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 236 may provide read access to state buffer 222 for a read access requesting device including, for example, computing engine 224 and post-processor 228. Write access engine 238 may provide write access to state buffer 222 for a write access requesting device including, for example, post-processor 228. Each of read access engine 236 and write access engine 238 may convert a sequential series of access operations (e.g., multiple read or write operations across multiple clock cycles) to a single access operation to reduce power and reduce wait latency. Each of read access engine 236 and write access engine 238 may be organized based on state buffer 222. For example, each of read access engine 236 and write access engine 238 may include multiple sub-engines corresponding to multiple SRAM banks of state buffer 222, with each sub-engine providing access to a corresponding SRAM bank. A sub-engine of read access engine 236 may convert a sequential series of read access operations to a corresponding SRAM bank for multiple data elements (e.g., by a row of computing engine 224 or by post-processor 228) to a single read access for the multiple data elements. A sub-engine of write access engine 238 may also convert a sequential series of write accesses for storing multiple data elements at the corresponding SRAM bank (e.g., by post-processor 228) to a single write access for the multiple data elements.

In some embodiments, neural network processor 202 may also include a stream processor (not shown in FIG. 2) that handles the parallel processing and coordinates the operations of the different processing engines in neural network processor 202.

One or more neural network processors 202 may be used to implement a deep neural network that may include multiple sets of convolution, activation, and pooling layers. For example, a neural network processor 202 may first receive input data and instructions for implementing a first set of convolution, activation, and/or pooling layers. The input data may include the network parameters for the set of network layers, such as the number of nodes, the weights, or the parameters of the filters, etc. The input data may also include the external input data to be processed by the neural network or intermediate output data from previous layers of the neural network. The instructions may include instructions for computing engine 224, activation engine 228a, and/or pooling engine 228b. After the input data are processed by the set of network layers, new input data and instructions for implementing a second set of convolution, activation, and/or pooling layers may be received by neural network processor 202. The new input data may include parameters for the second set of network layers and intermediate output data from the previous layers, and the new instructions may include the instructions to be executed by the second set of network layers. In this way, a neural network processor 202 may be used to implement multiple sets of network layers. As such, a deep neural network (e.g., a ResNet-50 network with 50 layers) may be implemented using a smaller number (e.g., 1, 2, 4, or 8) of neural network processors.

As described above, a neural network may include multiple processing engines and each processing engine may run independently to perform millions or billions of arithmetic operations. Thus, in some cases, the results generated by the initially implemented neural network may not be corrected due to various software and/or hardware errors associated with the neural network. For example, delivering the correct source data to the processing engine at the appropriate time may be challenging because the input data to a processing engine for an instruction may be corrupted due to various reasons, such as memory failures, noises on the bus, timing errors, etc. The circuits of the processing engine may also malfunction for various reasons, such as defects in silicon (including function and timing related defects) occurred at fabrication or due to reliability issues. Because of the large circuitry and the large amount of computation performed by the neural network, it may be difficult to pinpoint the software instruction or hardware circuit that may have caused the incorrect final results.

One method to debug the software and/or hardware associated with a neural network is to save the input data and/or output data for each instruction executed by a processing engine and compare the saved input data and/or output data with the expected input or output data for each instruction. However, the amount of input and/or output data for the instructions may be very large. Thus, a large memory space and a large bus bandwidth may be used in order to save the input/output data, which may significantly degrade the performance of the processing engine and the neural network. In addition, it may take significant effort to compare the large amount input and/or output data to find the discrepancy.

According to certain embodiments, the input and/or output data for each instruction executed by a processing engine may be processed by one or more debugging circuits configured to perform error detection coding, such as a parity check bit generator, checksum generator, or CRC bits generator (e.g., CRC-8, CRC-16, CRC-32, or CRC-64 generator). For example, a CRC circuit may be added before each input port of a processing engine and may be configured to generate CRC bits for the input data for each instruction. The CRC bits may be saved and compared with the CRC bits generated for expected or ideal input data to determine whether the correct input data for the instruction is sent to the processing engine. Similarly, a CRC circuit may be added at each output port of the processing engine and may be configured to generate CRC bits for the output data from the processing engine for each instruction. If the CRC bits for the input data match the expected CRC bits for the input data for an instruction, but the CRC bits for the output data do not match the expected CRC bits for the output data for the instruction, the processing engine may have malfunctioned for at least that instruction.

Figure 3:
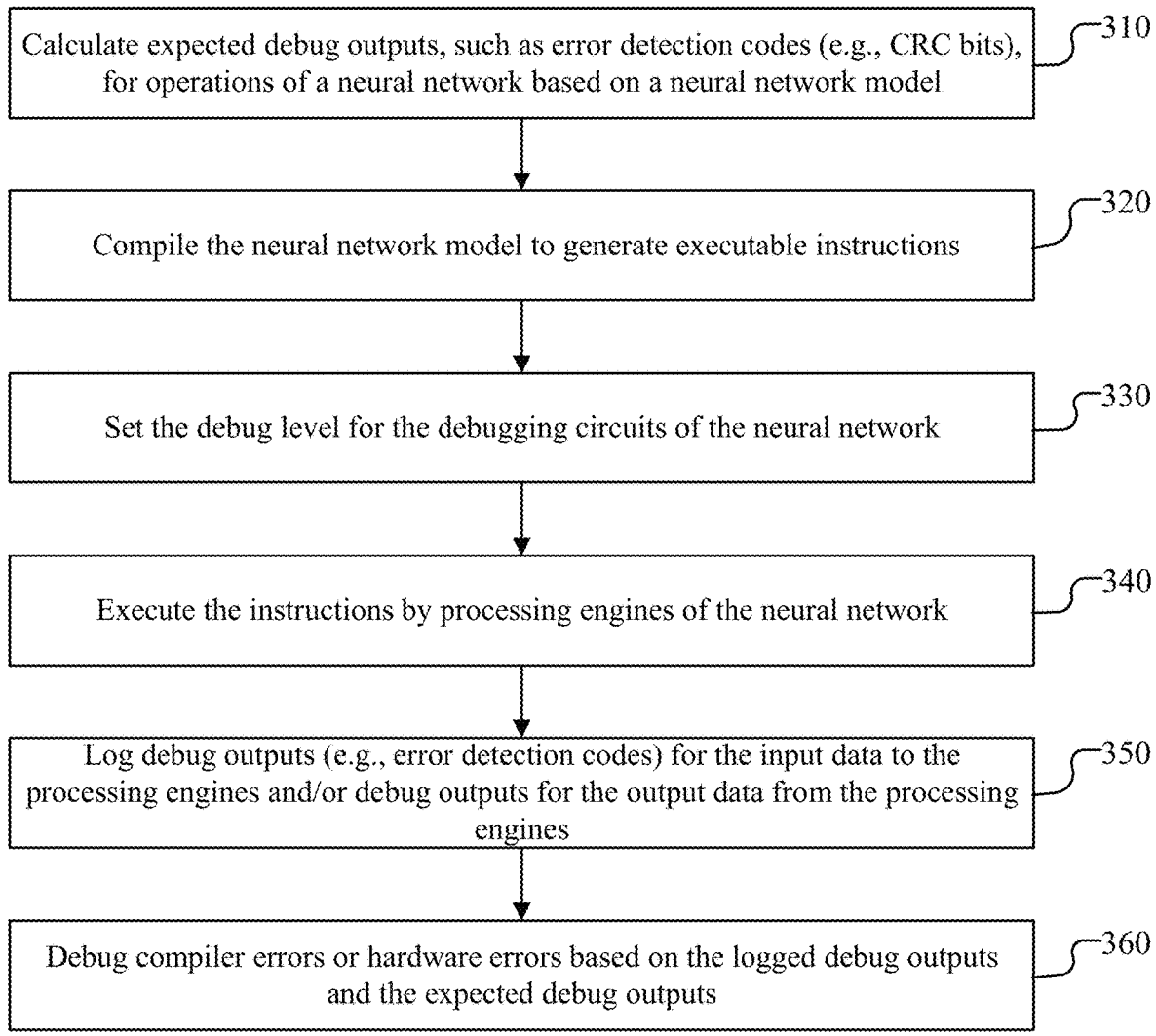
FIG. 3 is a simplified flow chart illustrating an example method for debugging a neural network according to certain embodiments.

FIG. 3 is a simplified flow chart 300 illustrating an example method for debugging a neural network according to certain embodiments. At block 310, ideal or expected debug output, such as error detection code (e.g., CRC bits), for each operation (or instruction) to be executed by the neural network may be calculated using a software model (e.g., functional C model) of the neural network. The ideal or expected debug output may be generated for the input and/or output data of the operation. For example, an example input data set (e.g., an example image including an object to be classified) may be used as the input data for generating the expected CRC bits. In general, the ideal debug output may be generated by a processor running the software model in a serial mode. Thus, the sequence, relative timing, the input data of the operations of the neural network may be guaranteed to be correct to generate the correct output data, regardless of which hardware circuit of the neural network would actually be used to perform the corresponding operations.

At block 320, a compiler may compile a neural network model to generate executable instructions. The compiling may include, for example, determining the processing engine used to perform an operation (e.g., convolution, polling, activation, multiplication, etc.), determining memory locations for storing various data for the neural network (e.g., input data to the neural network and parameters of the neural network, such as weights or filters parameters), determining the order of operations by different processing engines, and determining the relative timing of the operations. The executable instructions may be stored in a memory device and may be read by the various processing engines into corresponding instruction buffers for executing by the processing engines.

Optionally, at block 330, a desired debug level may be set for the neural network by configuring the debugging circuits. For example, as described above, the debugging circuits may include CRC generators at the input and/or output ports of the processing engine. The debugging circuits may be configured to a desired debug level by setting the appropriate bits in control registers. For example, in some cases, the debugging circuits may be turned off or bypassed. In some cases, the debugging circuits may be set to generate a debug output (e.g., a notification packet) for each instruction. The debugging circuits may alternatively be set to generate debug outputs for only certain instructions (e.g., high priority instructions labeled by a compiler). The debug output may be generated at the start of an instruction (e.g., CRC bits for input data), at an end of an instruction (e.g., CRC bits for output data), or both. In some embodiments, the debug level for a processing engine of the neural network may be individually specified for each respective instruction by, for example, the compiler.

At block 340, the neural network, more specifically, the processing engines of the neural network may execute the executable instructions, where the expected or ideal input data to the neural network may be the same as the input data used for generating the expected debug outputs. Each processing engine may be configured to execute a subset of the executable instructions. The processing engines may be coordinated by a stream engine that handles the parallel processing by the processing engines as described above. For example, an activation engine may be controlled to wait for the completion of an instruction by a convolution engine before starting an operation that uses the output of the activation engine.

At block 350, while the processing engines execute the instructions, the debugging circuits associated with the processing engines may generate debug outputs (e.g., error detection codes, such as CRC bits) for the input and/or output data associated with the instructions. The debug outputs may be saved in a memory device, such as a DRAM or solid state drive, through a memory interface. As described above, depending on the debug level set for the debugging circuits, one or more notification packets may be generated and saved for some or all instructions, where the notification packets may include the debug output, such as the CRC bits.

At block 360, the saved debug outputs (e.g., error detection codes, such as CRC bits) may be compared with the expected debug outputs (e.g., CRC bits) generated at block 310 to identify the first instruction for which the debug output generated by the debugging circuits may be different from the expected debug output. Based on the location or identification of the first instruction and whether the different debug outputs are for the output data or for both the input data and output data, the possible causes of the errors may be narrowed down to certain software instructions, hardware circuits, or both.

Figure 4:
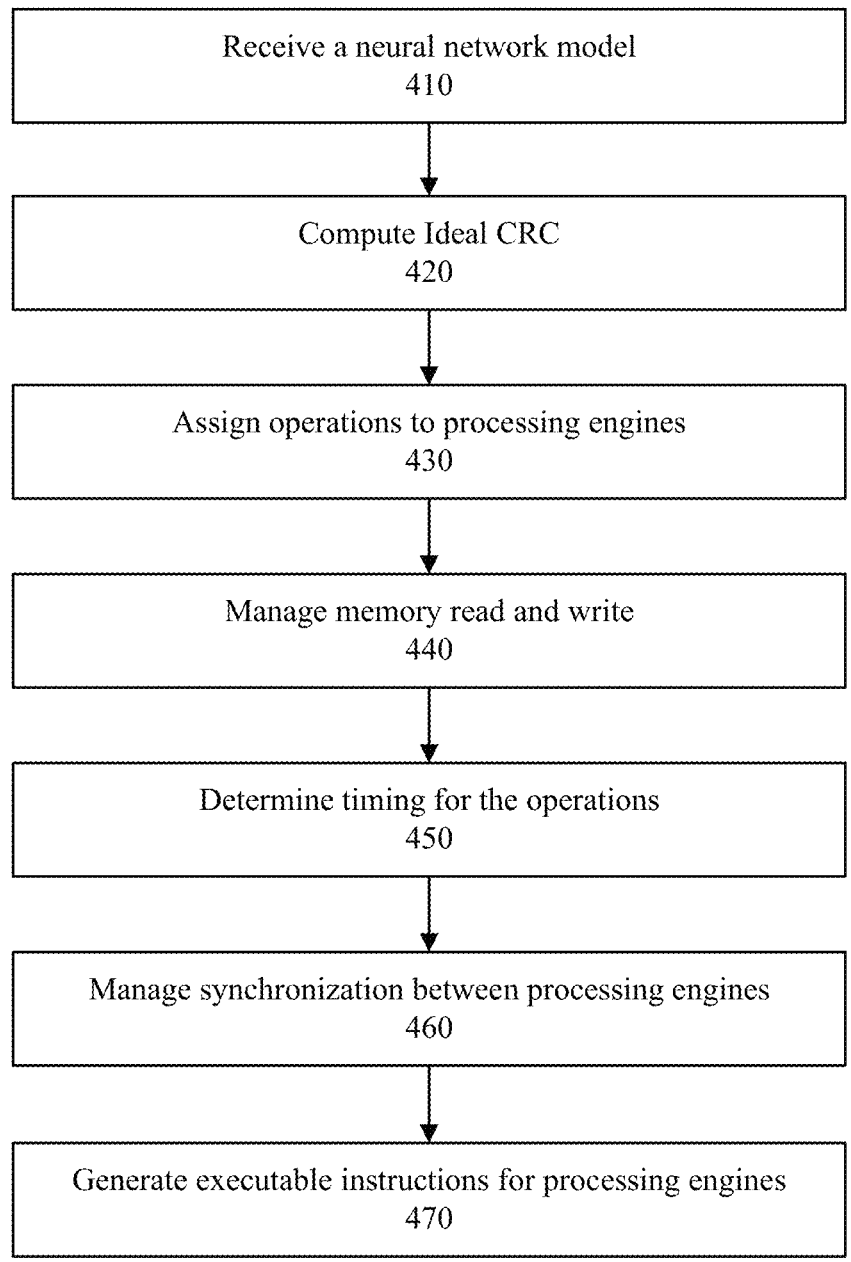
FIG. 4 illustrates an example process for compiling executable instructions to be performed by a neural network based on a neural network model according to certain embodiments.

FIG. 4 illustrates an example process 400 of compiling executable instructions to be executed by a neural network based on a neural network model according to certain embodiments. In some embodiments, process 400 may be performed by a compiler. The compiler may convert a neural network model into machine-executable instructions, such as binary instructions, that may be executed by various processing engines of the neural network. The compiler may also manage the allocation of different operations of the neural network to various hardware resources (e.g., processing engines), the allocation of memory for storing neural network parameters and intermediate data, and the timing and synchronization conditions between the various hardware resources.

At block 410, the compiler may receive a neural network model to be implemented using hardware resources. In some embodiments, the neural network model may describe the network architecture (e.g., layers and connection between nodes on the layers) and various parameters associated with the neural network. The neural network model may be a functional model described in a higher level programming language or hardware description language, such as C, C++, C#, Java#, python, R, Haskell, D, Ocaml, LISP, MatLab, etc.

At block 420, the compiler may calculate expected debug outputs, such as error detection codes (e.g., CRC bits), for various operations and instructions described in the neural network model. For example, the compiler may compute the ideal or expected CRC bits for the input data for an operation (e.g., filtering, convolution, activation, pooling, etc.) and the CRC bits for the output data of the operation based on the neural network model described in a high-level programming language, such as a functional C model. The CRC bits may be calculated for some sample input datasets used for debugging the implemented neural network, such as sample images to be classified using the implemented neural network. The CRC bits calculated based on the functional model and sample input datasets may be performed in a serial mode, and thus the order of the operations and the timing of the operations are generally guaranteed to match the descriptions in the model. In addition, in the software model-based simulation, the input data to the functional model are generally guaranteed to be corrected. Therefore, the CRC bits generated based on the functional model may be the ideal or expected CRC bits for the operation, even though it may take more time to calculate the expected CRC bits using the functional model than computing the CRC bits using the neural network implemented in hardware. The expected CRC bits for an operation of the neural network may be independent of the actual hardware resource in the implemented neural network that may be used to perform the operation.

At block 430, the compiler may assign the operations of the neural network to various available hardware resources (e.g., processing engines) for implementing the neural network. For example, the compiler may assign a multiplication operation to a PE array or an activation engine. In some embodiments, the compiler may maintain a list of available hardware resources and the functions and usage of the hardware resources of the neural network, and assign operations of the neural network to appropriate hardware resources based on the functions and usage of the hardware resources.

At block 440, the compiler may manage the memory access by the various hardware resources, such as the processing engines. For example, the compiler may specify the source memory address where the input data for an operation may be stored, and allocate memory space for storing the output data for the operation. In some cases, the source memory address where some input data for an operation is stored may be the allocated memory space for storing the output data of a previous operation. For example, some input data to an activation engine may be the output data from a previous convolution operation performed by a PE array, and some input data for a convolution operation may be the output data from a previous pooling engine. The compiler may determine the source memory address for the input data and the destination memory address for the output data for an operation based on available memory space and the size of the input or output data.

At block 450, the compiler may determine the operational timing for the operations of the neural network. For example, the compiler may determine the order of the operations to be executed by the various processing engines.

At block 460, the compiler may manage the synchronization between the processing engines. For example, the compiler may determine that a second operation by a processing engine may not start until the completion of a first operation by another processing engine, such as after the output data of the first operation has been written into a memory device.

At block 470, the compiler may generate executable instructions to be executed by the processing engines. In some embodiments, one set of instructions may be generated for each respective processing engine. The instructions may include machine readable and executable code, such as binary code. The instructions may include certain timing for the instructions, such as the wait time between two instructions or the conditions to be met before starting an instruction. During run time, the instructions may be loaded into the respective instruction buffers for the processing engines and executed by the processing engines.

In some embodiments, generating the executable instructions for the processing engines may include determining the debugging level for each operation or instruction. For example, the compiler may determine that, for some operations or instructions, no debugging may be needed; and, for some other operations or instructions, debugging may be performed at the start and/or end of each operation. In some embodiments, the compiler may set certain fields in the header of an instruction to indicate the desired debug level for the instruction. More detail of the different debug levels is described below.

Figure 5:
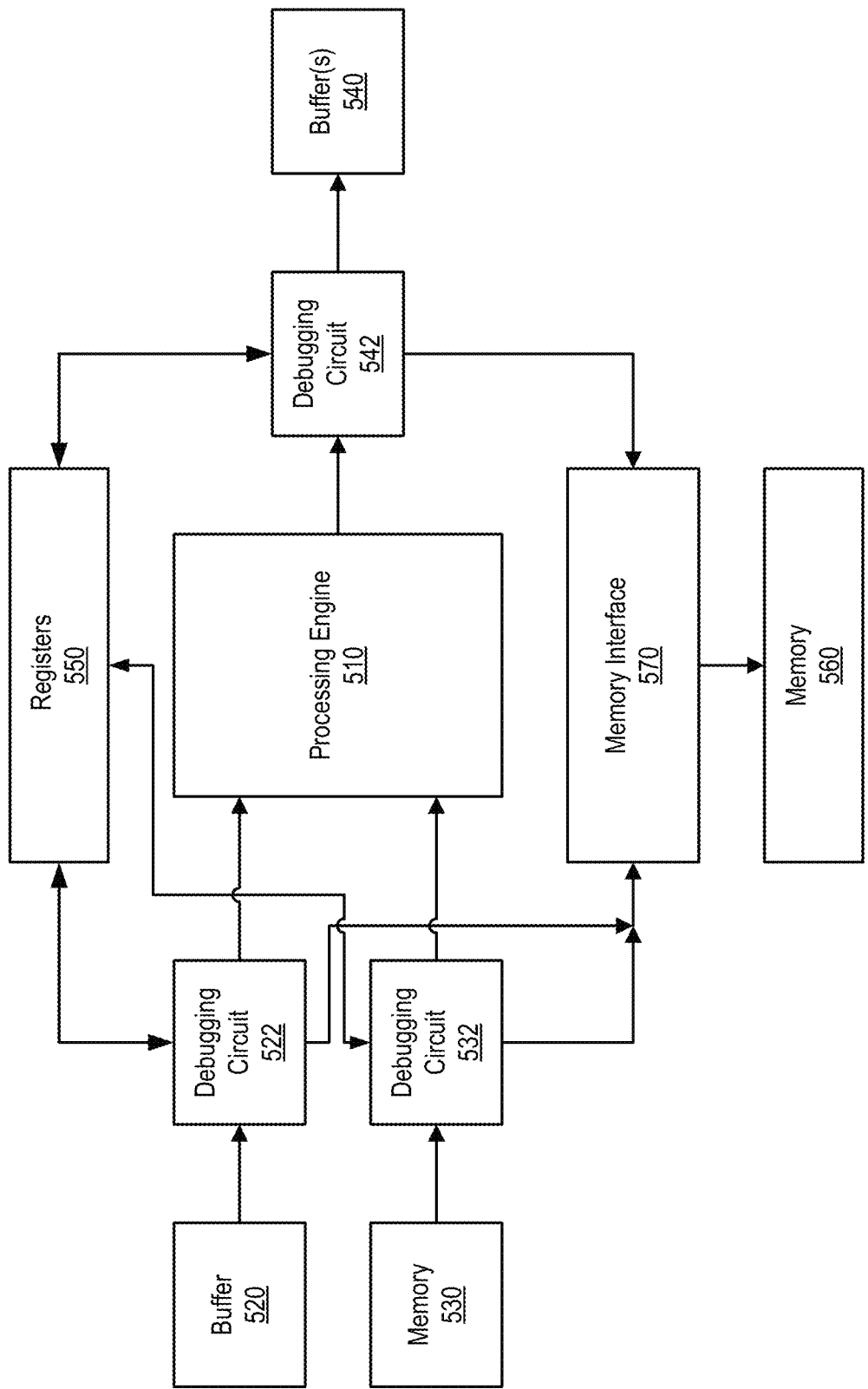
FIG. 5 is a simplified block diagram illustrating an example subsystem of a computing system (e.g., a neural network) with debugging circuits configured to generate a datalog for debugging the computing system according to certain embodiments.

FIG. 5 is a simplified block diagram of an example subsystem 500 of a computing system (e.g., a neural network) including debugging circuits configured to generate a datalog for debugging the computing system according to certain embodiments. Subsystem 500 may include a processing engine 510, which may be, for example, a convolution engine, an activation engine, a pooling engine, or any other processing engine of a computing system (e.g., a neural network). Processing engine 510 may include one or more input ports and one or more output ports. For example, in some embodiments, processing engine 510 may include an input port for receiving data from a buffer 520, such as receiving intermediate results from output buffer 226 of FIG. 2. In some embodiments, processing engine 510 may include an input port for receiving data from a memory 530, such as receiving parameters for a network layer (e.g., weights or filter parameters) from memory 212. Processing engine 510 may include an output port for sending processing results of processing engine 510 to one or more buffers 540, such as state buffer 220 and output buffer 226.

Subsystem 500 may include a debugging circuit, such as an error detection code generator (e.g., a CRC circuit), at each of the input ports and output ports. For example, a debugging circuit 522 may be added between buffer 520 and processing engine 510 to generate error detection codes (e.g., CRC bits) for the input data received by processing engine 510 from buffer 520. A debugging circuit 532 may be added between memory 530 and processing engine 510 to generate error detection codes (e.g., CRC bits) for the input data received by processing engine 510 from memory 530. Another debugging circuit 542 may be added between buffer(s) 540 and processing engine 510 to generate error detection codes (e.g., CRC bits) for the output data generated by processing engine 510. Debugging circuits 522, 532, and 542 may be connected to a memory 560 through a memory interface 570 to save the CRC bits generated by debugging circuits 522, 532, and 542 into memory 560.

In some embodiments, subsystem 500 may also include one or more registers 550. Registers 550 may be used to configure debugging circuits 522, 532, and 542. In some embodiments, registers 550 may include control and status registers (CSRs) that can be used to control operations of debugging circuits 522, 532, and 542 and indicate statuses of debugging circuits 522, 532, and 542. As described above, the debugging circuits, such as debugging circuits 522, 532, and 542, may be set to different debug levels, where the debug levels may determine whether and when the debug output may be generated for the instructions. The debug levels may be set by configuring corresponding bits in registers 550.

In some applications, a debugging circuit may be set to the lowest debug level, where the debugging circuit may be turned off or bypassed such that no debug output may be generated for any instructions executed by a corresponding processing engine. In some applications, the debugging circuit may be set to a debug level such that debug outputs may only be generated for selected instructions. For example, some instructions may be selected by a compiler and identified as instructions for which debug outputs may be generated. In some applications, a debugging circuit may be set to a debug level where the debug output may only be generated at the start of an instruction for the input data to the processing engine. In some applications, a debugging circuit may be set to a debug level where debug output may only be generated for the output data from the processing engine at the end of an instruction. In some applications, a debugging circuit may be set to a debug level where debug outputs may be generated at both the start (e.g., for input data) and the end (e.g., for output data) of an instruction. In some applications, a debugging circuit may be set to a debug level where debug outputs may be generated only for selected instructions and only at the start or the end of each selected instruction.

In some applications, a debugging circuit may be set to a debug level where the debug output may be generated based on a debug level set for each individual instruction. For example, the compiler may set the debug level for each instruction by setting a field in a header of the instruction, and the debugging circuit may read the field in the header of the instruction to determine whether no debug output may be generated for the instruction or whether the debug output may be generated at the start, at the end, or at both the start and the end of the instruction.

In some embodiments, the debug outputs (e.g., the CRC bits) may be saved in a notification packet, which may also include the identification of the associated instruction and other information, such as the processing engine that executes the instruction and a time associated with the execution of the instruction.

Figure 6:
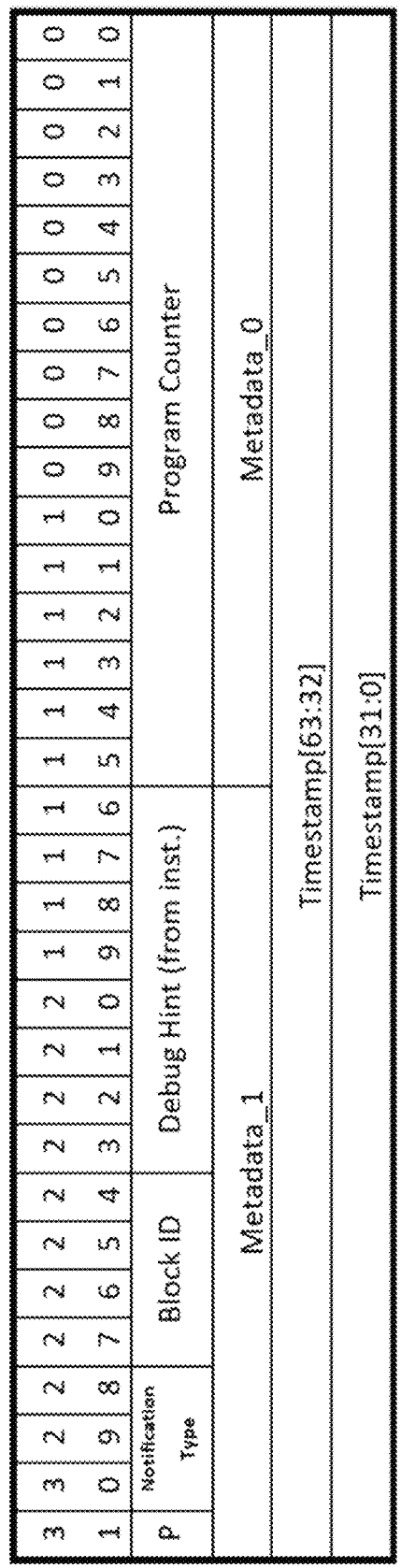
FIG. 6 illustrates an example debug output (e.g., a notification packet) generated by a debugging circuit of a neural network for debugging the neural network according to certain embodiments.

FIG. 6 illustrates an example debug output (e.g., a notification packet 600) generated by debugging circuits of a neural network for debugging the neural network according to certain embodiments. In the example debug output shown in FIG. 6, notification packet 600 includes 16 bytes. For example, notification packet 600 may include a "Notification Type" field that specifies the type of notification. For example, a "4" in the "Notification Type" field may indicate that the notification is generated at the start of an instruction, and a "5" in the "Notification Type" field may indicate that the notification is generated at the end of the instruction. Notification packet 600 may also include a "Block ID" field that indicates the processing engine associated with the debugging circuit that generates the notification packet, such as the convolution engine (or PE array), the activation engine, or the pooling engine. Notification packet 600 may include a "Debug Hint" field that may include a byte from the corresponding instruction to identify possible instruction buffer corruption. Notification packet 600 may include a "Program Counter" field that may indicate the program counter of the instruction buffer associated with the instruction. Notification packet 600 may also include two metadata fields, "Metadata_1" and "Metadata_2" field. Each metadata field may include CRC-16 bits for input data or output data associated with the instruction. In some embodiments, each metadata field may include two CRC-8 words for two instructions. In some embodiments, notification packet 600 may include a 64-bit timestamp that indicates the time associated with the notification. For example, the timestamp may indicate the starting or completion time of the instruction, which may be represented by the total number of clock cycles after a reset at the starting or completion time of the instruction.

Figures 7A, 7B:
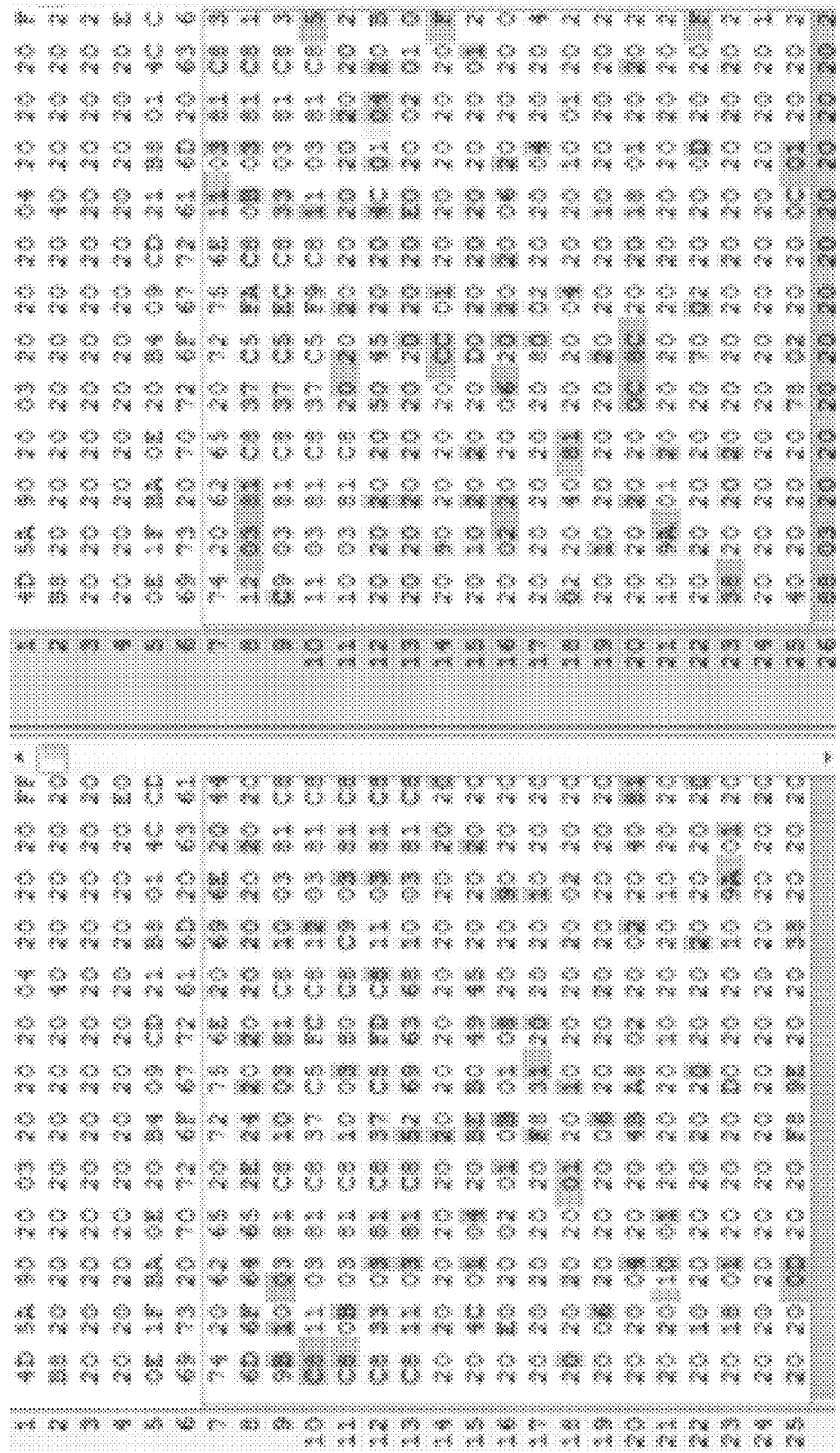
FIG. 7A illustrates an example debug datalog generated using a software model of a neural network.
FIG. 7B illustrates an example debug datalog generated by a debugging circuit of the neural network according to certain embodiments.

FIG. 7A illustrates an example debug datalog 700 generated using a software model of a neural network. FIG. 7B illustrates an example debug datalog 750 generated by debugging circuits of a neural network according to certain embodiments. If the software and hardware of the neural network are implemented properly, the debug datalog generated using the software model of the neural network and the debug datalog generated by the debugging circuits of the neural network would match. If there are any compiler errors or hardware errors in the implemented neural network, the two debug datalogs may have some mismatches. For example, as shown in FIGS. 7A and 7B, the two debug datalogs may be the same at the beginning (e.g., the first 6 lines in the figures), but may start to differ from each other on line 7. Based on, for example, the location of the first difference and the debug level set for the debugging circuit, the exact instruction corresponding to the first difference and whether the input or the output data for the instruction is wrong may be determined.

Because the error detection codes (e.g., CRC bits) of the input and/or output data, rather than the actual input and/or output data, are logged, the memory used for storing the error detection codes and the bandwidth of the bus for sending the error detection codes to the memory may be significantly reduced and generally would not significantly affect the performance of the processing engine. For example, if a neural network is implemented using four neural network processor (e.g., neural network processor 202) each including 3 processing engines, an instruction can be completed in about 256 clock cycles, each debug output (e.g., notification packet) includes 16 bytes, and two notifications are generated for each instruction, the bandwidth used to transmit the debug outputs is about 16 B×4×3×2÷256=1.5 B per clock cycle. If the processing engines operate at 1 GHZ per second, the bandwidth used to transmit the debug outputs is about 1.5 GB per second. Thus, adding the debugging circuits for tracking the execution of the instructions by the processing engines has minimal or negligible impact on the performance of the processing engines. In addition, for an inference that may take, for example, about 10 millisecond (such as on a ResNet-50, batch 16), the debugging circuits may only generate about 15 MB debug output data. Thus, a small memory space can be used to store debug output data.

Figure 8:
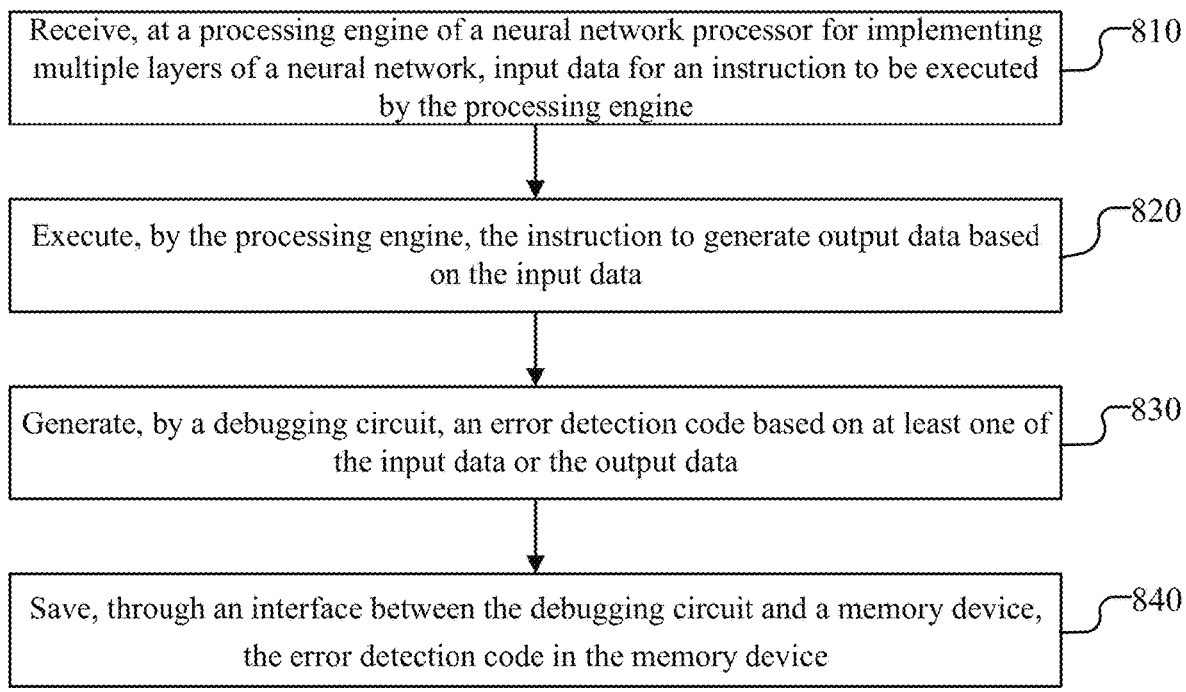
FIG. 8 is a simplified flow chart illustrating an example method for debugging a neural network according to certain embodiments.

FIG. 8 is a simplified flow chart 800 illustrating an example method for debugging a neural network according to certain embodiments. The method may be implemented by the systems described above, such as, for example, subsystem 500 of a computing system described above.

At block 810, a processing engine of a neural network processor for implementing multiple layers of a neural network may receive input data for an instruction to be executed by the processing engine. As described above, the neural network processor may include multiple processing engines, such as a convolution engine, an activation engine, and a pooling engine, and may be used to implement multiple sets of a convolution layer, an activation layer, and/or a pooling layer by loading different network parameters and instructions at different times. As also described above, the instruction may be generated and assigned to the processing engine by a compiler based on a neural network model. The input data may include parameters (e.g., weights) for a network layer or input data (e.g., an image file) to be processed by the processing engine.

At block 820, the processing engine may execute the instruction to generate output data based on the input data. For example, the processing engine may include a convolution engine, and may perform a convolution operation between the input data (e.g., an image file) and a filter (e.g., a 2-D matrix), and generate a feature map for the input data.

At block 830, a debugging circuit of the neural network processor may generate an error detection code based on at least one of the input data or the output data. As described above, a debugging circuit may be added at each port of one or more input ports and/or output ports of the processing engine. The debugging circuit may include an error detection code generator configured to generate an error detection code for the input data received at each input port or generate an error detection code for the output data from each output port of the processing engine. In some embodiments, the error detection code generator may include a parity check bit generator, a checksum generator, or a CRC bits generator, such as a CRC-8, CRC-16, CRC-32, or CRC-64 generator. As described above, the debugging circuit can be set to different debug levels, where the debugging circuit may be configured to generate no error detection codes, generate error detection codes for some but not all the instructions, generate an error detection code only at a start of an instruction, generate an error detection code only at an end of the instruction, generate error detection codes at both the start of the instruction and the end of the instruction, or generate error detection codes based on a value set in a field in a header of the instruction.

At block 840, the debugging circuit may save the error detection code in a memory device through an interface between the debugging circuit and the memory device. In some embodiments, the debugging circuit may generate a notification packet that includes the error detection code and save the notification packet to the memory device. In some embodiments, the notification packet may also include an identification of the instruction, an identification of the processing engine that executes the instruction, and/or a timestamp indicating an execution time of the instruction by the processing engine.

In some embodiments, the method may also include receiving an expected error detection code for the instruction generated by a compiler based on a functional model of the neural network, and comparing the error detection code saved in the memory device with the expected error detection code. An error or defect (e.g., a compiler error or hardware defect) of the neural network or the first instruction that causes an error may then be identified based on the first difference between the error detection codes saved in the memory device and the expected error detection codes. The implemented neural network may then be modified to correct the error or defect.

Even though FIGS. 3, 4, and 8 describe the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Figure 9:
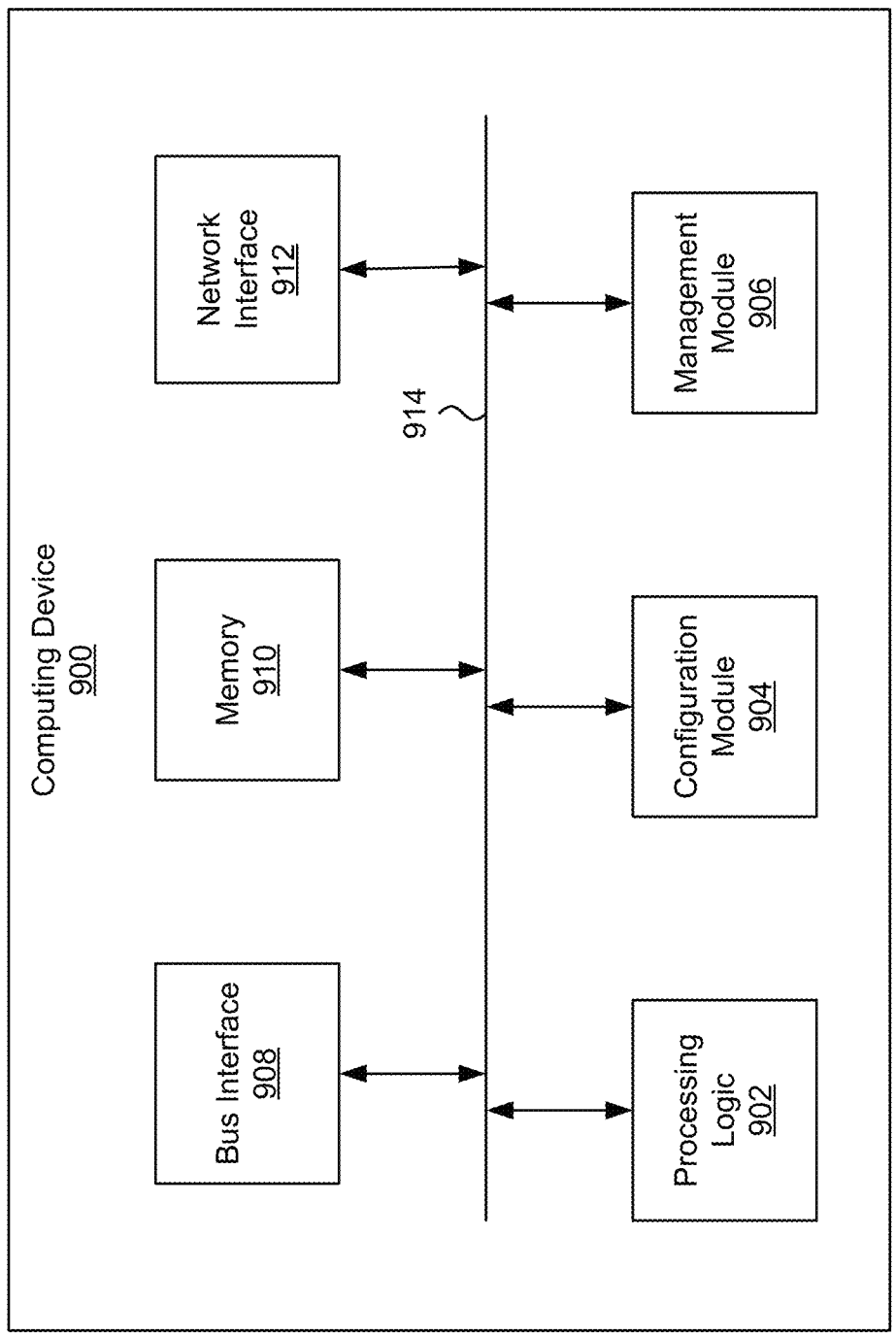
FIG. 9 illustrates an example of a computing device for implementing some of the embodiments disclosed herein.

FIG. 9 illustrates an example of a computing device 900 for implementing some of the embodiments disclosed herein. Functionality and/or several components of the computing device 900 may be used without limitation with other embodiments disclosed elsewhere in this disclosure, without limitations. Computing device 900 may perform computations to facilitate processing of a task. As an illustrative example, computing device 900 can be part of a server in a multi-tenant compute service system. Various hardware and software resources of computing device 900 (e.g., the hardware and software resources associated with provision of an image recognition service) can be allocated to a client upon request.

In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
 calculating, by a compiler based on a functional model of a neural network, expected error detection codes of input data or output data for operations of the neural network;
 generating, by the compiler based on the functional model of the neural network, executable instructions for processing engines of the neural network, the executable instructions corresponding to the operations of the neural network;

executing, by the processing engines of the neural network, the executable instructions;

generating, by error detection code generating circuits of the neural network, actual error detection codes for actual received input data or actual output data of the processing engines, while the processing engines execute the executable instructions;

saving the actual error detection codes generated by the error detection code generating circuits;

determining a first difference between the actual error detection codes and the expected error detection codes; and identifying a hardware or software defect of the neural network that causes the first difference.

2. The computer-implemented method of claim 1, wherein:

the expected error detection codes include the expected error detection codes for the input data and the output data for the operations of the neural network; and the error detection code generating circuits are configured to generate actual error detection codes for both the actual received input data and the actual output data of the processing engines.

3. The computer-implemented method of claim 1, wherein:

the error detection code generating circuits of the neural network are configurable to generate actual error detection codes according to different debug levels; and the computer-implemented method further comprises setting the error detection code generating circuits to a debug level from the different debug levels.

4. The computer-implemented method of claim 1, wherein:

the functional model includes a functional C model; and the error detection code generating circuits include cyclic redundancy check (CRC) circuits.

5. A neural network processor comprising:

a processing engine configured to execute instructions to implement multiple layers of a neural network and to generate output data based on input data to the processing engine;

a debugging circuit physically distinct from and coupled to the processing engine, the debugging circuit configured to generate error detection codes for the input data to the processing engine or error detection codes for the output data generated by the processing engine, wherein the debugging circuit is further configured to determine a debug level at which to operate, and wherein the debugging circuit can operate at different debug levels, the different debug levels including a first debug level settable to cause error detection code generation at a start of an individual instruction executed by the processing engine and a second debug level settable to cause error detection code generation at an end of the individual instruction; and an interface to a memory device, wherein the interface is configured to save the error detection codes generated by the debugging circuit into the memory device.

6. The neural network processor of claim 5, wherein the debugging circuit comprises a first error detection code generating circuit and a second error detection code generating circuit, wherein:

the first error detection code generating circuit is configured to generate error detection codes for the input data to the processing engine; and the second error detection code generating circuit is configured to generate error detection codes for the output data generated by the processing engine.

7. The neural network processor of claim 5, further comprising a control register, wherein the debugging circuit is configured to determine the debug level at which to operate based on one or more values indicating which of the different debug levels has been set, and wherein the one or more values indicating which of the different debug levels has been set include at least one of:

a first value in the control register, the first value indicating a debug level for multiple instructions executed by the processing engine, or a second value in a field of the individual instruction, the second value indicating a debug level that is specific to the individual instruction.

8. The neural network processor of claim 7, wherein the one or more values indicating which of the different debug levels has been set include the first value, and wherein the first value can be set to cause the debugging circuit to be bypassed for all instructions executed by the processing engine.

9. The neural network processor of claim 7, wherein the one or more values indicating which of the different debug levels has been set include the first value, and wherein the first value can be set to cause the debugging circuit to generate error detection codes for some, but not all, of the instructions executed by the processing engine.

10. The neural network processor of claim 7, wherein the one or more values indicating which of the different debug levels has been set include the second value.

11. The neural network processor of claim 10, wherein the second value can be set to at least one of:

a value indicating that no error detection code is to be generated for the individual instruction;

a value indicating that an error detection code is to be generated at the start of the individual instruction;

a value indicating that an error detection code is to be generated at the end of the individual instruction; or a value indicating that a first error detection code is to be generated at the start of the individual instruction and a second error detection code is to be generated at the end of the individual instruction.

12. The neural network processor of claim 10, wherein the second value is determined by a compiler while compiling a functional model describing the neural network and separately for each instruction executed by the processing engine.

13. The neural network processor of claim 5, wherein the debugging circuit includes a cyclic redundancy check (CRC) circuit.

14. The neural network processor of claim 5, wherein:

the debugging circuit is further configured to generate a notification packet, the notification packet including:

an identification of the individual instruction;

an error detection code generated by the debugging circuit before or after the processing engine executes the individual instruction; and an identification of the processing engine.

15. A computer-implemented method, comprising:
receiving, at a processing engine of a neural network processor for implementing multiple layers of a neural network, input data for a first instruction to be executed by the processing engine;
executing, by the processing engine, the first instruction to generate output data based on the input data;
determining, by a debugging circuit of the neural network processor, a debug level at which to operate, wherein the debugging circuit can operate at different debug levels, the different debug levels including a first debug level settable to cause error detection code generation at a start of the first instruction and a second debug level settable to cause error detection code generation at an end of the first instruction;
after determining the debug level at which to operate, generating, by the debugging circuit, one or more error detection codes for the first instruction based on at least one of the input data or the output data and according to the debug level at which to operate, wherein the debugging circuit is physically distinct from and coupled to the processing engine; and
saving, through an interface between the debugging circuit and a memory device, the one or more error detection codes in the memory device.

16. The computer-implemented method of claim 15, further comprising:
determining the debug level at which to operate based on one or more values indicating which of the different debug levels has been set, wherein the one or more values indicating which of the different debug levels has been set include at least one of:
a first value in a control register, the first value indicating a debug level for multiple instructions executed by the processing engine, or
a second value in a field of the first instruction, the second value indicating a debug level that is specific to the first instruction.

17. The computer-implemented method of claim 15, wherein saving the one or more error detection codes in the memory device includes:
generating, by the debugging circuit, a notification packet, the notification packet including:
an error detection code of the one or more error detection codes;
an identification of the first instruction;
an identification of the processing engine; and
a timestamp indicating an execution time of the first instruction by the processing engine; and
saving the notification packet in the memory device.

18. The computer-implemented method of claim 17, further comprising:
receiving an expected error detection code for the first instruction, the expected error detection code generated by a compiler based on a functional model of the neural network;
comparing a corresponding error detection code saved in the memory device with the expected error detection code; and
identifying a hardware or software defect of the neural network based on a difference between the corresponding error detection code saved in the memory device and the expected error detection code.

19. The computer-implemented method of claim 16, further comprising:
setting the first value or the second value to cause the debugging circuit to:
generate an error detection code at the start of the first instruction;
generate an error detection code at the end of the first instruction; or
generate error detection codes both at the start of the first instruction and at the end of the first instruction.

20. The computer-implemented method of claim 16, wherein the one or more values indicating which of the different debug levels has been set include the first value, the method further comprising:
setting the first value to cause the debugging circuit to generate error detection codes for some, but not all, instructions executed by the processing engine.

* * * * *